I. S. MEAD.
Water-Heaters.
No. 142,035.  Patented August 19, 1873.
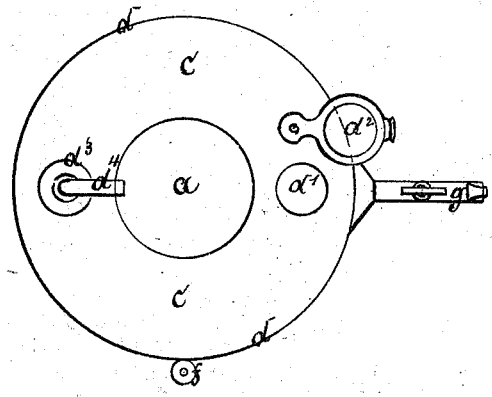
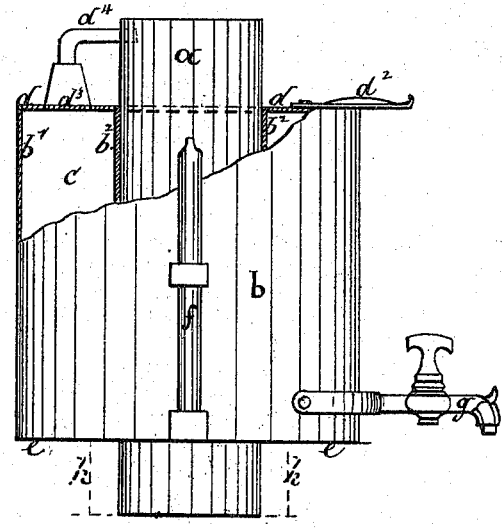
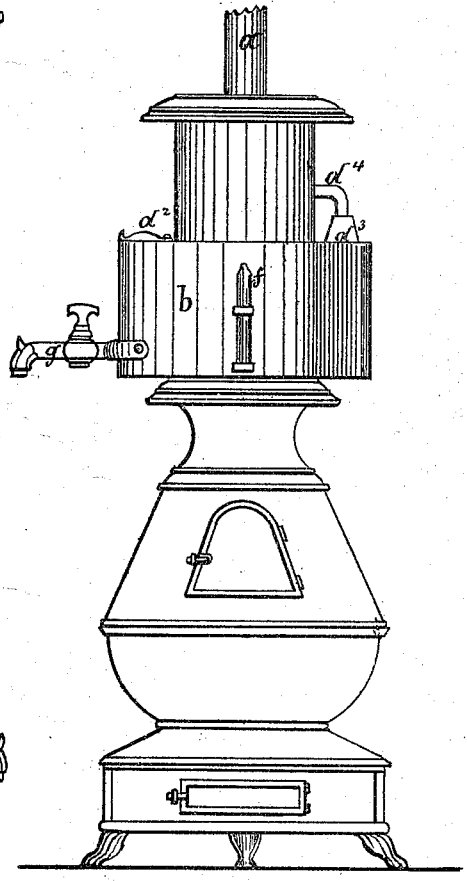
Witnesses
A. P. Lacey.
W. A. Dangerfield.
Inventor
Israel S. Mead
by Colborne Brookes & Co.
his attorneys.

UNITED STATES PATENT OFFICE.

ISRAEL S. MEAD, OF BLUE EARTH CITY, MINNESOTA.

IMPROVEMENT IN WATER-HEATERS.

Specification forming part of Letters Patent No. 142,035, dated August 19, 1873; application filed May 14, 1873.

*To all whom it may concern:*

Be it known that I, ISRAEL S. MEAD, of Blue Earth City, county of Faribault, in the State of Minnesota, have invented certain Improvements in Heaters for Water and other Liquids, of which the following is a specification:

My invention relates to the production, as a new article of manufacture, of an annular heater, adapted to be readily applied to the exterior of a stove-pipe, or to the drum of a stove, for the purpose of heating water or other liquids for domestic or other purposes, and which will be found particularly useful in cases of illness, or at other times when it is not convenient to employ the ordinary cooking-stove, or when persons have not the use of such accommodations.

In carrying out my invention, I construct my heater of two plates of metal, firmly soldered, riveted, or otherwise connected together, so as to form an annular space between such plates. The upper and lower ends of these annular plates or rings are then connected together by annular plates, the plate at the upper end being provided with an aperture, (covered by a slide or cap,) through which water to be heated is supplied to the apparatus. A second aperture is also formed in the upper plate, to which a pipe or tube is connected, for the purpose of allowing steam to escape. This pipe or tube is conducted into the stove-pipe, or into the interior of the drum of the stove. A gage is formed on the side of the apparatus, connected with the lower portion of the interior of the heater, in order to indicate the quantity of water or other liquid from time to time contained in the heater. A tap or faucet is provided, by means of which the water or other liquid may be drawn from the heater.

But that my invention may be fully understood, I will describe the same in detail by aid of the accompanying drawings.

Figure 1 represents a side view, partly in section, and Fig. 2 a plan, of my improved heater applied to a stove-pipe.

$a$ represents a portion of a stove-pipe, and $b$ my improved heater applied thereto. $b^1 b^2$ are two plates of metal, riveted or otherwise connected together, so as to leave an annular space, C, between them, the inner plate, $b^2$, being formed into a ring of the desired size to fit the stove-pipe $a$, while the plate $b^1$ may form a ring of any desired size, according to the desired capacity of the chamber or space C. The upper and lower ends of the annular plates or rings $b^1 b^2$ are connected together by means of annular plates $d\ e$. The plate $d$, at the upper end, is provided with an aperture, $d^1$, (provided with a slide or cap, $d^2$,) through which water or other liquid is supplied to the chamber C. Another aperture is formed in the plate $d$, at $d^3$, to which a pipe or tube, $d^4$, is connected, for the purpose of allowing steam to escape thereby into the stove-pipe $a$. $f$ is a glass gage, formed on the side of the apparatus, and connected, at $f'$, with the chamber C, in order to indicate from time to time the quantity of water contained in such chamber. $g$ is a tap or faucet, through which water or other liquid may be drawn from the apparatus, when required. $h$ is a gallery, which rests on the stove-plate, and may be employed to support the heater.

Fig. 3 represents one of my improved heaters applied to the exterior of the drum of a stove.

In this view the same letters of reference are employed to indicate corresponding parts, so that further description is unnecessary.

It will be readily seen that heaters constructed according to my invention may be readily applied to or removed from stove-pipes or the drums of stoves without necessitating the alteration of any parts of the same, and, when not required, can be easily removed.

Having thus described my invention, what I claim, and desire to secure by Letters Patent, is—

As a new article of manufacture, an annular domestic heater, adapted to be applied to and removed from the exterior of a stove-pipe, or the exterior of the drum of a stove, such heater being constructed of annular plates $b^1$ $b^2$, connected together by plates $d\ e$, the plate $d$ being provided with apertures $d^1\ d^3$, cap or cover $d^2$, and pipe $d^4$, and the external plate $b^1$ having applied thereto a gage, $f$, and tap $g$, all arranged and constructed substantially as shown and described.

ISRAEL S. MEAD.

Witnesses:
D. E. CROUCH,
J. A. KEISTER.